United States Patent [19] [11] 4,059,328
Rigo [45] Nov. 22, 1977

[54] MOUNTINGS FOR ELECTRICAL FIXTURES IN JUNCTION BOXES

[76] Inventor: Larry E. Rigo, P.O. Box 805, Marietta, Ga. 30061

[21] Appl. No.: 706,725

[22] Filed: July 19, 1976

[51] Int. Cl.$^2$ ............................................. H01R 13/60
[52] U.S. Cl. .................................. 339/122 R; 174/53; 339/133 R; 339/198 GA
[58] Field of Search ................... 174/53; 248/DIG. 6; 339/122 R, 122 F, 132 R, 132 B, 133 R, 198 GA, 198 R

[56] References Cited

U.S. PATENT DOCUMENTS

| 1,540,330 | 6/1925 | Hartmann | 339/133 R |
| 1,812,756 | 6/1931 | Riggs | 248/DIG. 6 |
| 2,876,394 | 3/1959 | Gerrish | 174/53 |

FOREIGN PATENT DOCUMENTS

| 22,045 | 10/1958 | Germany | 339/133 |

Primary Examiner—Roy Lake
Assistant Examiner—Mark S. Bicks
Attorney, Agent, or Firm—Dowell & Dowell

[57] ABSTRACT

For use with standard junction boxes, mounting structures for supporting electrical fixtures in the junction boxes, the mountings including in each modification illustrated in the drawings a fixture holder bracket which has a bottom portion supported on two leg portions which lie parallel to the side walls of a standard junction box, the leg portions having at their upper ends attaching means for attaching the bracket to the junction box, and the bracket having in their bottom portion specially shaped edges which are formed upwardly in such a way that the edges first diverge, and then converge so as to provide a clip structure adapted to receive and tightly grip the inner mounting portion of an electrical fixture which is snapped into the bracket, the bracket being supported on the junction box, and the fixture being in turn supported by the bracket within the junction box.

8 Claims, 7 Drawing Figures

MOUNTINGS FOR ELECTRICAL FIXTURES IN JUNCTION BOXES

FIELD OF INVENTION

This invention relates to improved mounting structures for supporting electrical fixtures in standard electrical junction boxes. As used in the present disclosure, the term "fixture" is intended to cover a large variety of electrical modules, such as wall mounted receptacles, switches, terminal blocks, light-supporting fixtures, etc. As used in the present disclosure, the term "junction box" is intended to include not only boxes where groups of wires enter the box and are joined together to form branches of a circuit, but also to include other boxes such as receptacle outlet boxes which are wall mounted, floor mounted, or ceiling mounted, switch boxes, electrical service entrance boxes, and fuse block boxes, etc.

BACKGROUND AND PRIOR ART

It is customary in the electrical wiring art as presently practised under the local codes and ordinances setting forth satisfactory wiring procedures, to mount a junction box, and to screw appropriate fixtures into the box, thereafter wiring the fixtures using various techniques including wire nuts for joining two wires together in the absence of a terminal at a fixture, or using spring loaded gripping devices or screw terminals on fixtures in order to terminate the wiring at the fixtures. The technique of mounting the fixtures by screwing them to the box is a time consuming job and is frequently made more difficult by damage to the threaded areas of the box during plastering of a wall, thereby making insertion of the fixtures into the box by screw means more difficult. In order to avoid this difficulty, the prior art has proposed a number of different variations on the usual techniques for mounting fixtures to a box, for instance, using spring loaded snap devices as shown in U.S. Pat. No. 3,576,520 to Stauffer, U.S. Pat. No. 1,933,358 to Almcrantz, U.S. Pat. No. 2,934,590 to Thompson et al, U.S. Pat. No. 3,885,852 to Grove, and several German patents including German Patent No. 1,130,491 dated Nov. 3, 1960 and German Pat. No. 1,186,122 dated Jan. 28, 1965. In each of these patents, either the fixture itself is mounted in the box by a spring-like snap-in structure, or else a bracket is mounted in a box in this manner and the fixture is attached to the bracket.

THE INVENTION AND OBJECTS OF THE INVENTION

The present invention provides an improved sheet metal bracket having means for attaching it to a box near the open outer ends of the box, and having special cooperative clip means in the bottom portion of the bracket which is located near the bottom wall of the box, and which clip means cooperates with specially shaped mounting portions on a fixture which may be any one of a number of different well known types, including wall receptacles, wall switches, fuse or circuit breaker modules, light fixtures, fuse blocks, and any one of a number of different varieties of terminal blocks. The mounting portions of the various possible fixtures, and the clip means of the various possible bracket means are standardized for easy interchangeability, and some of the bracket means are made adjustable as to length for the purpose of adapting them to boxes having different side wall spacings, and so as to adapt them to mount different numbers of modular units on the same bracket as may be required for a particular circuit.

It is a principal object of this invention to provide an improved mounting structure for mounting a variety of electrical fixtures into a variety of different standard electrical boxes in a manner which can be quickly and easily performed by workmen, while at the same time providing a secure mounting system which will be capable of Underwriters approval and approval by government agencies in charge of wiring codes and ordinances.

It is another object of this invention to provide an engagement between a mounting bracket and a variety of electrical fixtures which engagement is accomplished without requiring tools, but which provides a very secure mounting for the fixture to the bracket.

It is another object of this invention to provide an improved mounting bracket which is adjustable in length so as to permit it to be mounted to a wide variety of boxes having different separations between their side walls to which the bracket is to be mounted.

It is a corollary object of the invention to provide a mounting bracket which is adjustable in length whereby the bracket can be first telescoped together in order to make it narrow enough for insertion into a box having inwardly facing flanges around its outer periphery, whereupon the bracket can be telescoped outwardly after it has been inserted into the box so that it will grip the mounting flanges around the periphery of the box.

Still another object of the invention is to provide mounting brackets having attaching means for attaching the free ends of the leg portions of the bracket to a variety of different electrical boxes, which boxes are presently in common use, and which have various features of structure which can be used to secure the attaching means of the brackets to the box in a secure manner.

Still another object of the invention is to provide mountings for electrical fixtures using bracket means so designed that where a number of different brackets and fixtures are mounted side by side in close mutual proximity to each other, a selected fixture and bracket in the middle of such a cluster can be easily removed for rewiring or servicing or for changing of the fixture without disturbing the other bracket-supported fixtures mounted adjacent thereto within the box.

A further object of the invention is to provide fixture mounting brackets, some embodiments of which are especially designed to cooperate with the screws which pass through standard cover plates into threaded holes of the electrical boxes, the brackets not only providing clearance for such screws, but also using the screws to insure tight engagement between the mounting brackets and the box when the cover plate is in place and the screws are tightened in the hole in the box. In addition, these brackets are also provided with frictional gripping means supplementing the main securing of the brackets in place by the cover plate screws, such friction means temporarily gripping the side walls of the box so as to prevent displacement of the bracket with respect to the side wall before the cover plate is screwed into position.

Other objects and advantages of the invention will become apparent during the following discussion of the drawings, wherein:

THE DRAWINGS

Figure 1:
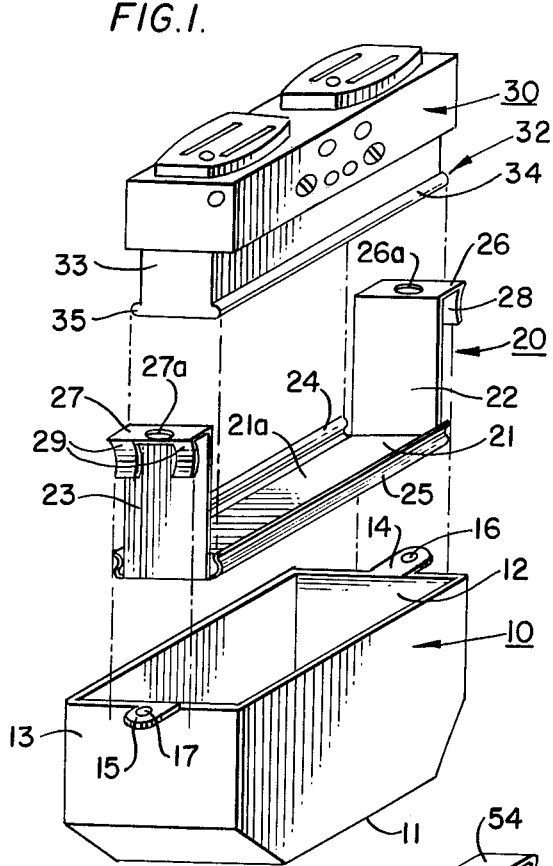
FIG. 1 is an exploded perspective view showing a box, a receptacle fixture, and a fixture holder according to the invention.

Referring now to the drawings, and in particular to FIG. 1, this figure shows a typical junction box of the type used to house domestic receptacle fixtures and light switch fixtures, the box being referred to by the reference numeral 10 and having a bottom wall 11, and opposed side walls 12 and 13. These side walls have ears 14 and 15 extending therefrom, in this case in the outward direction, and each of the ears have a threaded hole, the holes being labelled 16 and 17.

Figure 2:
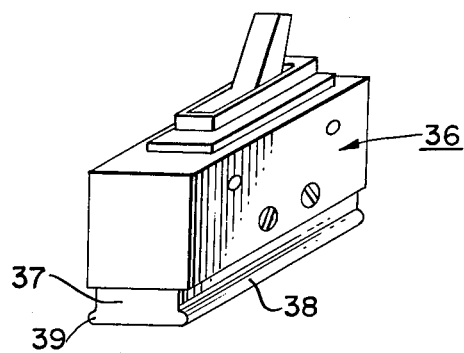
FIG. 2 shows in perspective a switch fixture which can be substituted for the receptacle fixture in FIG. 1.

The box 10 is intended to house a bracket 20 made in accordance with one embodiment of the present invention, this bracket including a bottom portion 21 and two leg portions 22 and 23. The bottom portion 21 has two parallel mutually spaced free edges 24 and 25, each of which extends longitudinally of the bracket 20 and includes substantially the full length of the bracket between the legs 22 and 23. Each of the parallel free edges 24 and 25 is turned so that it extends upwardly from the bottom portion of the bracket in a direction which would correspond with the upward direction out of the box 10, and these free edges are turned about a radius from the bottom wall 21a of the bottom portion 21 so that the upwardly turned free edges first converge toward each other, and then reverse their curvature to extend divergently with respect to each other so as to form between the upwardly extending edge portions a fixture receiving clip. Each of the electrical fixtures, of which the receptacle shown in FIG. 1 and the switch shown in FIG. 2 are typical, includes an upper electrical portion which comprises the outer portion of the fixture when it is mounted in a box, and this outer portion comprises an electrical unit suitable to be wired to wiring extending into the box, this wiring not being shown in the present drawings. For instance, with respect to the receptacle shown in FIG. 1, the outer electrical portion is referred to by the reference numeral 30, and includes suitable screws for attachment of the entering wires, and the receptacle also includes an inner mounting portion 32 which has a body 33 extending downwardly from the receptacle and terminating at its lower end in two longitudinally ridges 34 and 35, which can be as shown in the illustrative embodiments of the present invention semicylindrical in cross-section. The radius of the semicylindrical ridges 34 and 35 should be similar to the radius of curvature of the two clip portions 24 and 25 up to the point where they begin diverging.

FIG. 2 shows a switch 36 which is similar to the receptacle in the sense that the outer portion thereof is intended to be wired in the unusual manner and comprises the electrical switch, but the inner portion thereof is a mounting portion including a body 37 and two longitudinal ridges 38 and 39. It should be apparent that the switch of FIG. 2 and the receptacle of FIG. 1 are interchangeable insofar as the mounting bracket 20 is concerned, although different cover plates (not shown) will be required for their attachment.

In the bracket of FIG. 1, the upper end of each leg portion 22 and 23 ends in attaching lugs 26 and 27, each of which may be provided with a clearance hole on its top surface to pass a screw from a cover plate into the threaded holes 16 and 17 of the box 10. Each of the lugs 26 and 27 also has a clip member 28 and 29, two of which are provided in the version shown for the bracket 20 in FIG. 10, whereby the clip members 28 and 29 will straddle the ears 15 and 16 when the bracket is in place inside the box.

Figure 3:
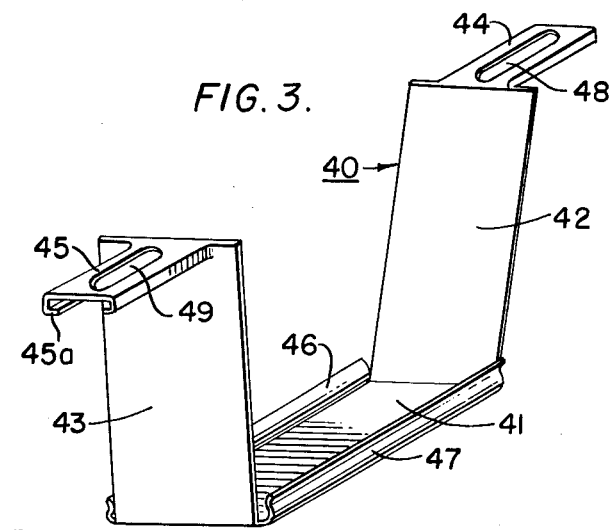
FIG. 3 shows in perspective a first modified form of the fixture holder bracket according to the present invention.

FIG. 3 shows an alternative form of the bracket shown in FIG. 1, and includes a bottom portion 41, leg portions 42 and 43 and attaching lug means 44 and 45. The bracket also includes divergent and convergent separate free edges 46 and 47 which are the same shape as the edges 24 and 25 in FIG. 1. In this particular structure the bracket member is provided with attaching lug members 44 and 45 which have elongated holes 48 and 49. The holes 48 and 49 are slotted to accomodate variations in the dimensions of the parts, and the lug members 44 and 45 can also be further reinforced by flanging in the manner shown at 45a. This flanging can also be used to receive a lug such as the lug 14 or 15 in the box 10, but in the case where the lug extends internally toward the center of the box rather than outwardly away from the center.

Figure 4:
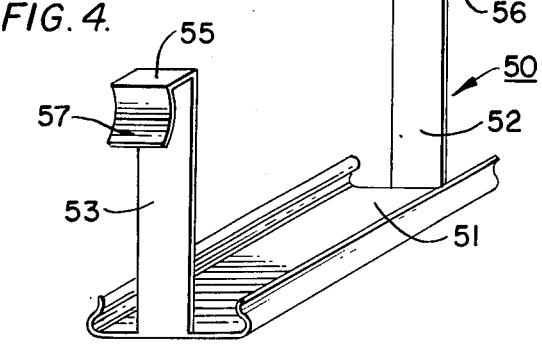
FIG. 4 shows in perspective a second modified form of the fixture bracket.

FIG. 4 shows still another variation of the bracket in which the bracket has a bottom portion 51, upstanding legs 52 and 53, top lug members 54 and 55 and downwardly extending clips 56 and 57 which clip onto the upper edge of a box where the box does not have ears as shown in FIG. 2, but instead is made of rather thick plastic or phenolic construction. In this event, the spacing between a clip such as the clip 56 and the adjacent leg portion 52 would be great enough to accomodate the thickness of the plastic junction box. In the event that the top edge of the plastic box is drilled and tapped, the bracket lugs 54 and 55 could be provided with clearance holes corresponding in location and function with the clearance holes 26a and 27a as shown in FIG. 1.

Both the brackets 40 and 50 as shown respectively in FIGS. 3 and 4 are provided with longer leg members than the bracket shown in FIG. 1, whereby these brackets may be used to mount modules or fixtures requiring a deeper box than the one shown in FIG. 1.

Figure 5:
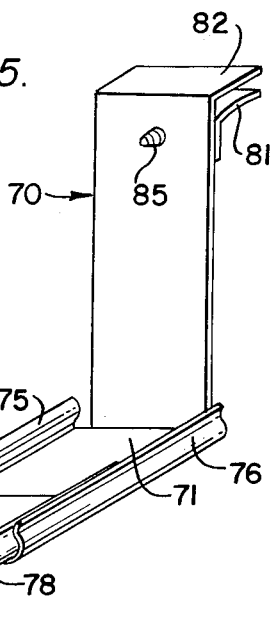
FIG. 5 shows in perspective a third modified form of the fixture holder bracket in which the bracket is made adjustable as to length.
Figure 6:
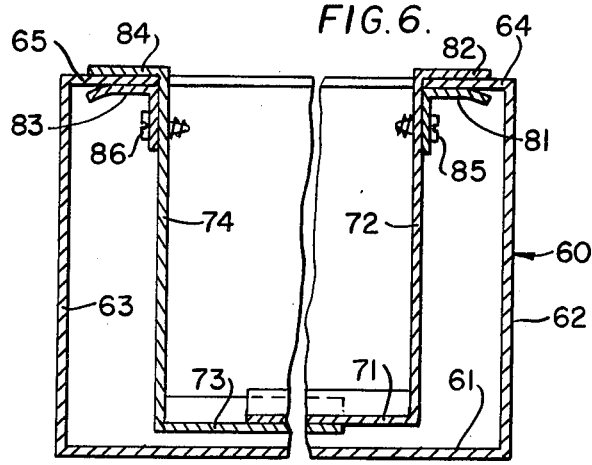
FIG. 6 shows in cross-section a bracket according to FIG. 5 mounted in a flanged box.

FIGS. 5 and 6 show still another modification of the invention intended for use with a box 60 such as the one shown in FIG. 6, this box having a bottom wall 61 and side walls 62 and 63 surrounded at their top by a flange 64 or 65 which extends inwardly of the box parallel with its lower bottom wall.

For use with an internally flanged box of the type shown in FIG. 6, which is used for instance in main service entrance installations, a bracket of the type shown in FIG. 5 is employed.

The bracket 70 is shown in FIG. 5, and comprises two separate pieces resembling when they are assembled the one piece brackets shown in FIGS. 1, 3, and 4.

The bracket 70 is made up of the piece which includes a bottom portion 71 and a leg portion 72, and the other piece comprises a bottom portion 73 and a leg portion 74. Each of the bottom portions 71 and 73 has a clip member comprising two upstanding free edges 75 and 76 on the first piece and 77 and 78 on the second piece. The clip members 77 and 78 are closer together than the clip member 75 and 76 so that the former can slide into the latter telescopically. The slide is a fairly tight fit so that the bracket does not change its length easily. Each of the upstanding leg portions 72 and 74 is provided with a pair of attaching lugs, including the lugs 81 and 82 on the leg 72 and the lugs 83 and 84 on the leg portion 74. The lugs 81 and 83 can be permanently attached to the legs, or alternatively, they can be screwed to the legs using the screws 85 and 86. By putting the screws through slotted holes as shown on the lug member 83, the movable lugs 81 and 83 can be made adjustable, thereby permitting their adjustment for the purpose of tightening and loosening the fit on the flange members 64 and 65.

It is an advantage to have the bracket shown in FIGS. 5 and 6 made adjustable as to length not only so that it can be used to fit different widths of boxes, but also so that it can be inserted into a box in a situation where it is closely confined by other brackets on both sides of it. For instance, the bracket in FIG. 5 can be telescoped together to provide its smallest length dimension as measured between the leg portions 72 and 74. The bracket can then be inserted into the box between the flanges 64 and 65, and expanded to a greater length once it is inside the box, so that the lug pairs 81 and 82, and 83, 84 will slide over the flanges 64 and 65 and grip the latter.

Figure 7:
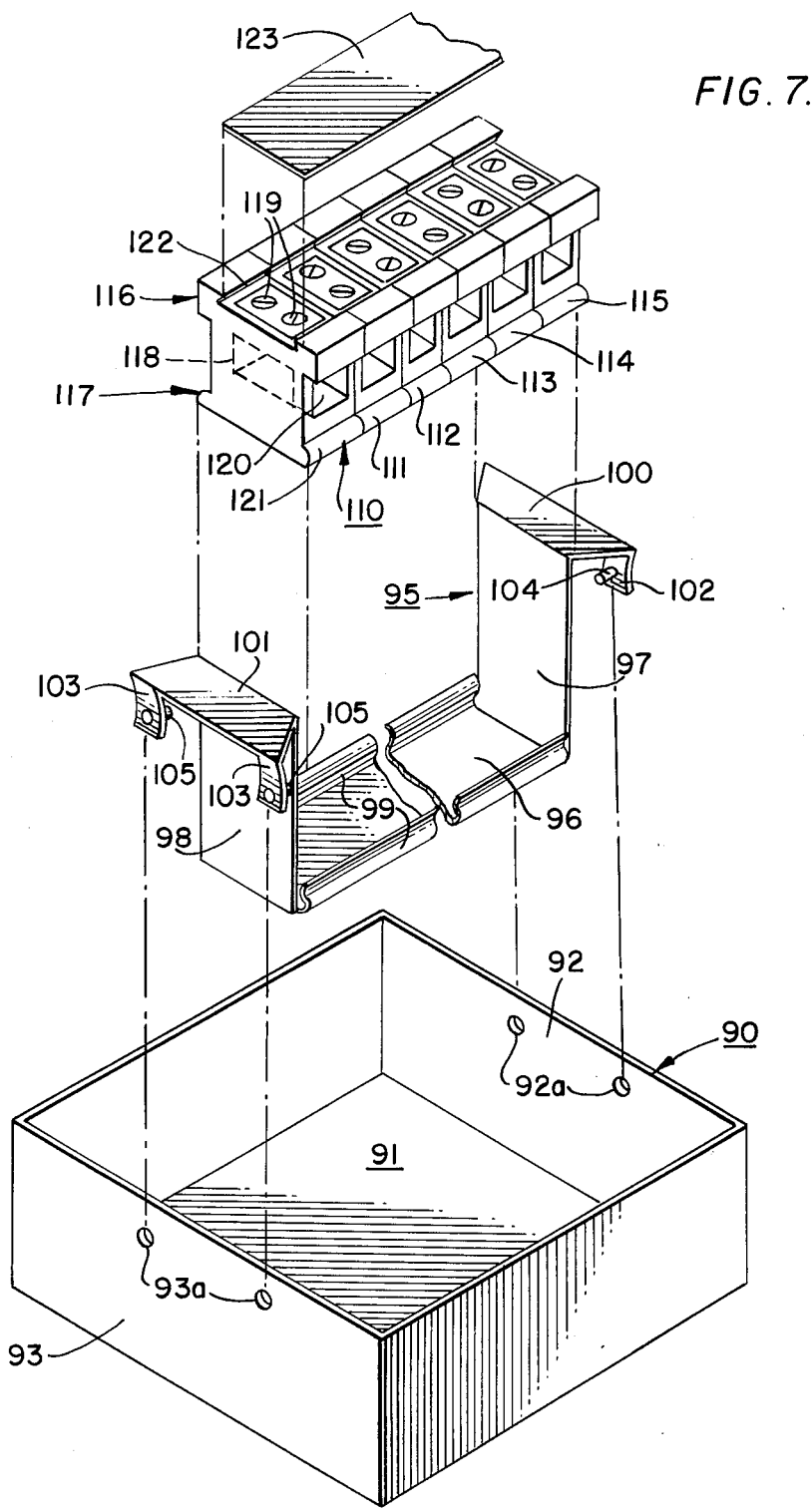
FIG. 7 is an exploded perspective view showing still another type of junction box, a stack of terminal fixtures, and a fixture holder bracket according to the invention.

Turning now to FIG. 7, this figure shows still another modification, this time used for mounting fixtures in a box such as the box 90, which has a bottom wall 91 and opposed side walls 92 and 93. Each of the side walls has one or more pairs of holes such as the holes 92a and 93a.

The bracket 95 comprises a bottom portion 96 and two upstanding leg portions 97 and 98. The bottom portion of the bracket includes opposed clip means 99 which are similar to those shown in the brackets of FIGS. 1, 3, 4 and 5. Each leg of the bracket 95 has an attaching means comprising a lug member 100 and a lug member 101. These members extend parallel to the bottom portion 96 and terminate in downwardly extending clips such as the clips 102 and 103. Each of the clips has a pin 104 and 105 permanently attached to it so that when the bracket 95 is inserted into the box 90, the pins 104 and 105 will snap into the holes 92a and and 93a respectively.

It is not necessarily true that only a single fixture will be supported in the clips 99 of the bracket of FIG. 7, or for that matter in the clips shown in any of the other figures. At the top of FIG. 7, there is shown a stack of six individual terminal blocks including the blocks 110, 111, 112, 113, 114 and 115. Referring to the terminal block 110 as being a typical fixture, it will be seen that this block has an outer electrical portion 116 and an inner mounting portion 117. Electrical portions and the mounting portions are both molded of a suitable plastic material, but the outer electrical portion has a copper insert 118 molded therein and provided with terminal screws 119 which can be used to tighten wires pushed into the hole 120 in that particular terminal block.

The inner mounting portion of each terminal block such as the portion 117 of the block 110 has a semicylindrical ridge 121 which extends in a direction corresponding with the lengthwise dimension of the bottom portion 96 of the fixture holder bracket 95. Of course, the semicylindrical ridges of the six blocks 110 through 115 inclusive all are mutually aligned. They can therefore be snapped into the clip 99 of the bracket 95 either individually or as a composite fixture formed of the six stacked modules or terminal blocks.

Each terminal block has chamfered upper edges 122 which form a recess into which a terminal cover 123 can slide to provide extra protection. The box 90 shown in FIG. 7 is, however, generally provided with a cover plate which covers the entire box and its contents as is required by safety ordinances is most jurisdictions.

The main cover for the box is not illustrated in this drawing.

The advantage of the terminal blocks shown in FIG. 7, is that all of the wires can be tightened with regard to their connections merely by checking the individual terminal screws 119 with a screwdriver, thereby periodically compensating for any tendency which the wiring junctions might have to loosen, perhaps due to frequent thermal expansion and contraction as the wires heat under heavy loads, and cool afterwards, this being a very substantial feature from the safety point of view, since loose connections cause electrical fires.

Another advantage of the terminal block as shown in FIG. 7 is that individual blocks can be removed and replaced, and the wiring can be easily moved around within the blocks to accomodate changes in circuitry.

This invention is not to be limited to the exact forms of the embodiments shown in the figures of the drawings, for obviously changes may be made in the scope of the following claims:

I claim:
1. An improved mounting for electrical fixtures to be wired into junction boxes having side walls joining at their inner ends a bottom wall, comprising:
   a. a fixture holder bracket having a bottom portion and having leg portions joining at their inner ends said bottom portion and mutually spaced apart by a separation such that when the bracket is inserted into a box, said leg portions will lie adjacent to opposed side walls of the box when the bottom portion lies parallel to the bottom wall of the box;
   b. means for attaching the outer ends of the leg portions to the box near the outer ends of its side walls;
   c. the bottom portion of the holder bracket having two spaced parallel free edges extending longitudinally between said leg portions, each of these free edges being turned along the full length of the bracket to extend outwardly from the bottom portion then convergently toward each other and then divergently from each other to form between the edges a fixture receiving clip; and
   d. an electrical fixture having an outer portion comprising an electrical unit to be wired, and having an inner mounting portion receivable into the bottom portion of the bracket at any longitudinal location along said bottom portion between its legs and its clip edges, the inner mounting portion of the fixture having longitudinal ridges extending in mutually opposite directions therefrom and located to snap into and precisely fit said clip edges when the electrical fixture is against said bottom portion.

2. In a mounting as set forth in claim 1, said longitudinal ridges on said mounting portion of the fixture being semicylindrical in cross-section, and said clip edges being turned in the vicinity of said bottom portion of the bracket to converge about a radius equal to the radius of said semicylindrical cross-section and then to diverge to facilitate snapping of the mounting portion of the bracket into said clip.

3. In a mounting as set forth in claim 1, said holder bracket being divided into two separate pieces transversely across its bottom portion, and said pieces being telescopically joined together by sliding the clip edges of one piece between the similarly shaped clip edges of the other piece, whereby the holder bracket is adjustable in length to fit junction boxes of different side wall spacings.

4. In a mounting as set forth in claim 3 for a junction box having a flange around the open outer ends of its side walls, the flange extending inwardly of the box parallel to its bottom wall, said means for attaching the outer ends of the bracket leg portions to the box comprising, near the outer end of each leg portion a pair of attaching lugs, the pairs of lugs on the leg portions respectively extending away from each other and lying parallel to the bottom portion of the bracket, the lugs in each pair being spaced close together so as to tightly grip the box flange between them, the adjustable length of the bracket permitting it to be shortened to enter the box and then lengthened after insertion so that the box flange is gripped between the lugs of each pair on each leg portion.

5. In a mounting as set forth in claim 4, one lug in each pair of lugs being adjustable with respect to the other lug in the same pair to adjust their spacing to fit box flanges of different thicknesses.

6. An improved mounting for electrical fixtures to be wired into junction boxes having side walls joining at their inner ends a bottom wall, comprising:
   a. a fixture holder bracket having a bottom portion and having leg portions joining at their inner ends said bottom portion and mutually spaced apart by a separation such than when the bracket is inserted into a box, said leg portions will lie adjacent to opposed side walls of the box when the bottom portion lies parallel to the bottom wall of the box;
   b. means for attaching the outer ends of the leg portions to the box near the outer ends of its side walls comprising, at the outer end of each leg portion an attaching lug member, said lug members extending oppositely from each other and lying parallel to the bottom portion of the bracket and disposed to extend over the outer ends of the side walls, and the lug members having at their outer ends clip members extending parallel to the side walls of the box and spaced from the leg portions of the bracket such that the clip members grip said side walls when the bracket is installed in the box;
   c. the bottom portion of the holder bracket having two spaced parallel free edges extending longitudinally between said leg portions, each of these free edges being turned to extend outwardly from the bottom portion then convergently toward each other and then divergently from each other to form between the edges a fixture receiving clip; and
   d. an electrical fixture having an outer portion comprising an electrical unit to be wired, and having an inner mounting portion receivable into the bottom portion of the bracket between its legs and its clip edges, the inner mounting portion of the fixture having longitudinal ridges extending in opposite directions therefrom and located to snap into said bottom portion between said clip edges.

7. In a mounting as set forth in claim 6, wherein the box has holes in its side walls near their outer ends, pins mounted in said clip members and extending inwardly therefrom toward the adjacent bracket leg portion and disposed such that when the bracket is inserted in the box, said pins snap into said holes in the side walls of the box.

8. In a mounting as set forth in claim 6, for a junction box having oppositely extending ears at the outer ends of its side walls, the ears having holes threaded to receive the screws of a cover plate, said lug members being disposed to at least partly overlie the ears of the box, and the lug members having clearance holes therethrough aligning with said threaded holes in the ears.

* * * * *